United States Patent
Lu (10) Patent No.: US 9,895,932 B2
(45) Date of Patent: Feb. 20, 2018

(54) TIRE TUBE

(71) Applicant: Chin-Lung Lu, Taichung (TW)

(72) Inventor: Chin-Lung Lu, Taichung (TW)

(73) Assignees: Yu-Jui Yang, New Taipei (TW); Ju-Ying Yu, New Taipei (TW)

( * ) Notice: Subject to any disclaimer, the term of this patent is extended or adjusted under 35 U.S.C. 154(b) by 129 days.

(21) Appl. No.: 15/068,639

(22) Filed: Mar. 14, 2016

(65) Prior Publication Data

US 2016/0193875 A1    Jul. 7, 2016

(30) Foreign Application Priority Data

Apr. 24, 2015 (TW) .............................. 104206264 U (51) Int. Cl.
  *B60C 5/10* (2006.01)
  *B60C 5/04* (2006.01)
(52) U.S. Cl.
  CPC . *B60C 5/10* (2013.01); *B60C 5/04* (2013.01)

(58) Field of Classification Search
  CPC .. B60C 5/10; B60C 5/04; B29D 22/02; B29D 22/023; B29D 22/026
  See application file for complete search history.

(56) References Cited

U.S. PATENT DOCUMENTS

| | | | | |
|---|---|---|---|---|
| 567,993 | A * | 9/1896 | McClymonds | B60O 5/04 152/511 |
| 638,188 | A * | 11/1899 | Smith | B60O 5/04 152/511 |
| 1,317,976 | A * | 10/1919 | Hower | B60O 5/04 152/511 |
| 6,192,633 | B1 * | 2/2001 | Hilbert | E04H 1/1277 52/2.18 |
| 2008/0223497 | A1 * | 9/2008 | Balzowski | B60O 5/04 152/454 |
| 2015/0367683 | A1 * | 12/2015 | Zhao | B60O 5/10 152/511 |

* cited by examiner

*Primary Examiner* — Daniel J Colilla (57) ABSTRACT

A tire tube includes a tube body and two connectors. The tube body includes an air jet, a first end and a second end. The two connectors are connected to the first end and the second end of the tube body respectively. One of the connectors includes an operating portion corresponding to a tube core of the tube body.

1 Claim, 11 Drawing Sheets

// TIRE TUBE

CROSS-REFERENCE TO RELATED APPLICATION

This application claims the benefit of Taiwan Application Serial Number 104206264, filed Apr. 24, 2015, which is herein incorporated by reference.

BACKGROUND OF THE INVENTION

1. Field of the Invention

The invention relates to a tire. More particularly, the invention relates to a tire cube that can be operated by an operator for features enable easy installation.

2. Description of Related Art

The tire type can be classified the tubeless tire and the tube tire. The tube tire comprises an outer tube and an inner tube so as to have the advantage of wear resistance and shock absorbing.

The inner tube which is made by integrated manufacturing extrusion molding into a closed shape is not only hard to be installed on the wheel, but also need to be repaired through qualified maintenance professional when it is broken.

Given the above, the following embodiments are disclosed a tire tube for the problems faced by in-depth studies, and making long-term efforts of development and production trial. It has greatly improves the mischief of the conventional technique.

SUMMARY OF THE INVENTION

According to one aspect of the invention, a tire tube includes a tube body and two connectors. The tube body comprises an air jet, a first end and a second end. The two connectors are connected to the first end and the second end of the tube body respectively, wherein one of the connectors comprises an operating portion corresponding to a tube core of the tube body.

The above and other objects, features and advantages of the invention will become apparent from the following detailed description taken with the accompanying drawings.

DETAILED DESCRIPTION OF THE INVENTION

<First Embodiment>

Figure 1:
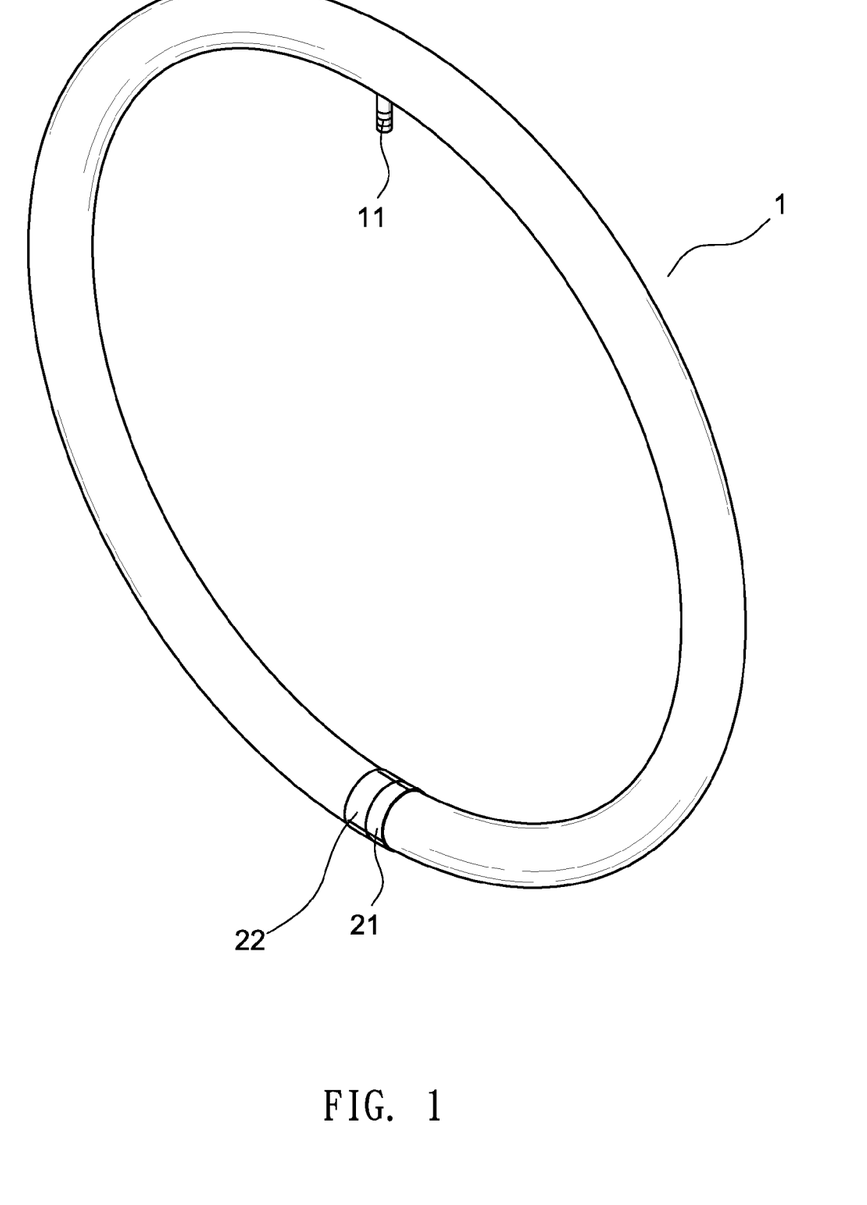
FIG. 1 is a schematic view of a tire tube according to the first embodiment of the invention.
Figure 2:
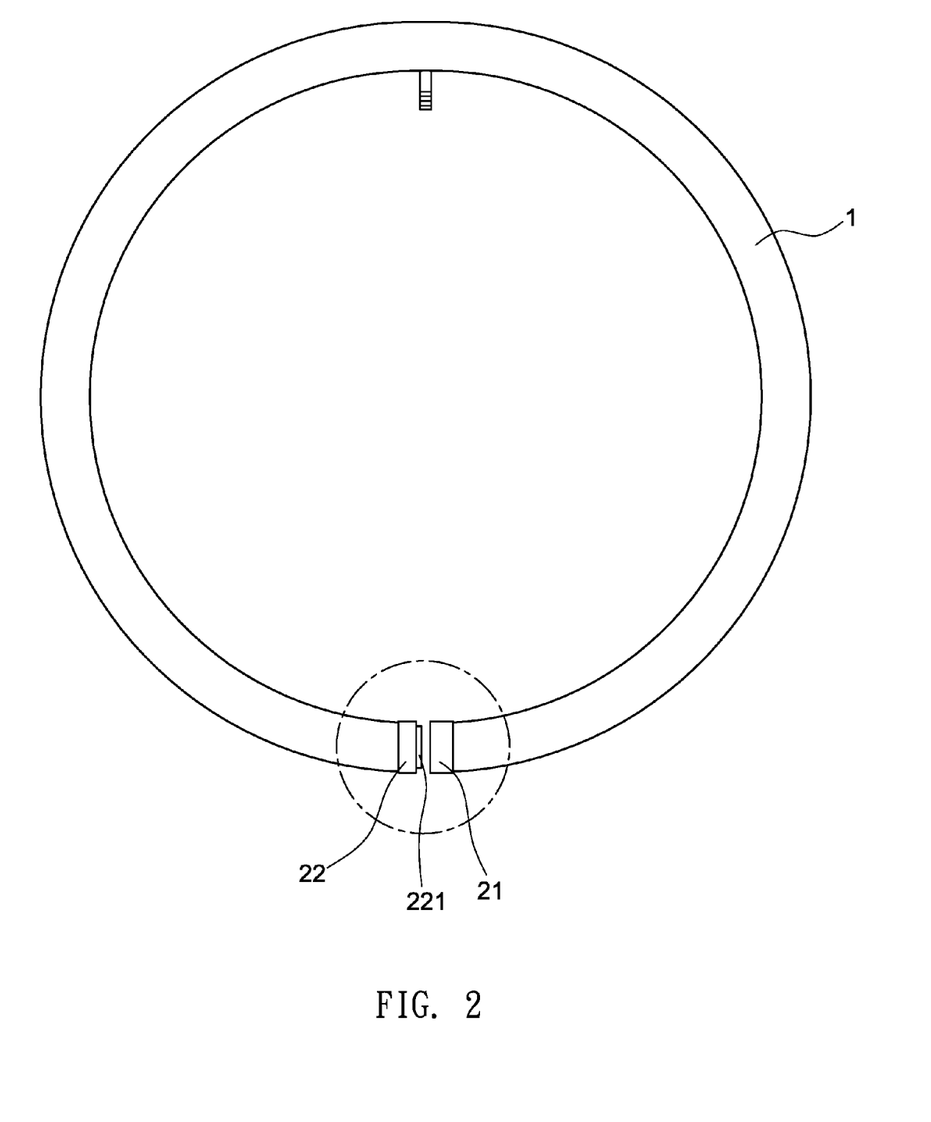
FIG. 2 is an another schematic view of a tire tube according to the first embodiment of the invention.
Figure 3:
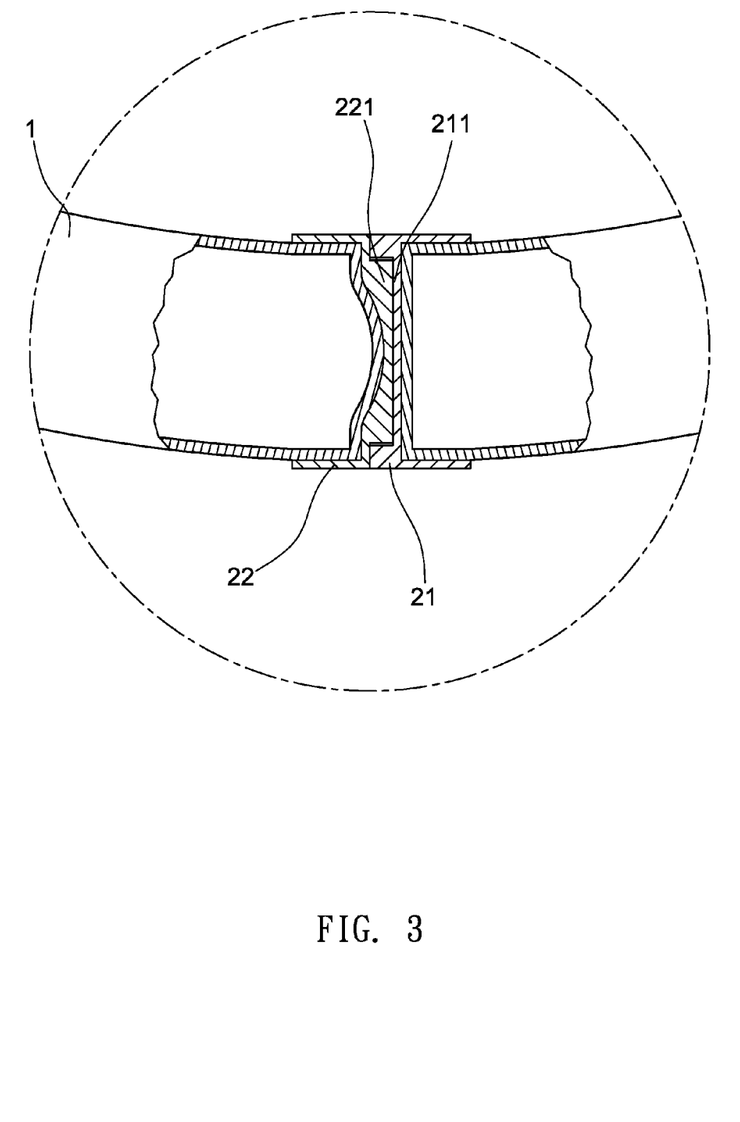
FIG. 3 is an enlarged partial cross-sectional view of the tire tube of FIG. 1.
Figure 4:
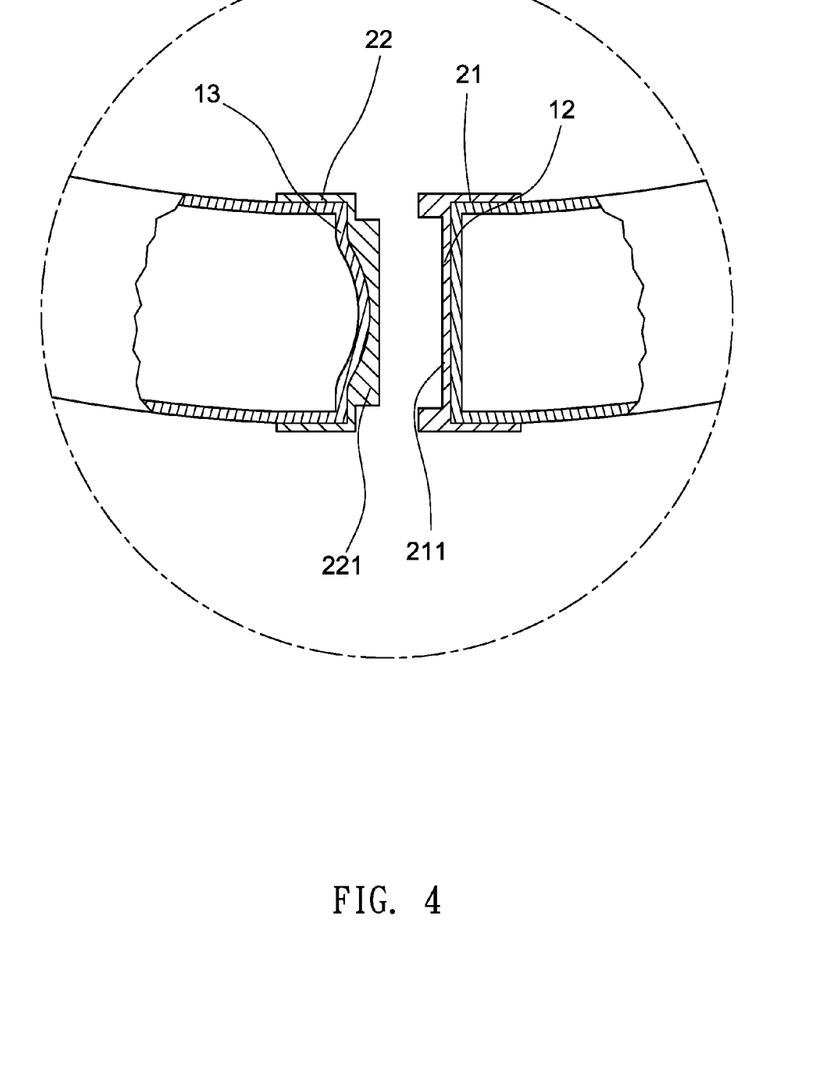
FIG. 4 is an enlarged partial cross-sectional view of the tire tube of FIG. 2.

FIG. 1A is a schematic view of a tire tube according to the first embodiment of the invention, FIG. 2 is an another schematic view of a tire tube according to the first embodiment of the invention, FIG. 3 is an enlarged partial cross-sectional view of the tire tube of FIG. 1, FIG. 4 is an enlarged partial cross-sectional view of the tire tube of FIG. 2. In FIG. 1, FIG. 2, FIG. 3, and FIG. 4, tire tube includes a tube body 1, a composite member 21 and a connector 22.

The tube body 1 is formed as a semi-closed shape and comprises an air jet 11, a first end 13 and a second end 12.

The composite member 21 is located on the second end 13 of the tube body 1 and comprises a concave portion 211.

The connector 22 is located on the first end 13 of the tube body 1 and comprises a convex portion 221 corresponding to the concave portion 211 of the composite member 21. The concave portion 211 and the convex portion 221 will expand after gas charging and make the concave portion 211 and the convex portion 221 fit each other, thus result in possible to secure the tube body 1 is fixed to a rim.

The connection between the composite member 21 and the second end 12 of the tube body 1 and the connection between the connector 22 and first end 13 of the tube body 1 can be achieved by adhesives, therefore it is not easy to separate when external force being applied, even more significantly enhance the strength of the tube body 1.

Furthermore, the cross area of the convex portion 221 of the connector 22 and the cross area of the concave portion 211 of the composite member 21 less than the cross area of the tube body 1, the convex portion 221 of the connector 22 is supported against the tube body 1, the concave portion 211 of the composite member 21 is supported against the tube 1, which lead a mutual positioning and a hard separation.

According to the first embodiment of the invention, the tube body 1 can be installed and uninstalled more quickly, and can be combined with more secure after installation to make significant savings in manpower and time, increase efficiency and safe.

<Scond Embodiment>

Figure 5:
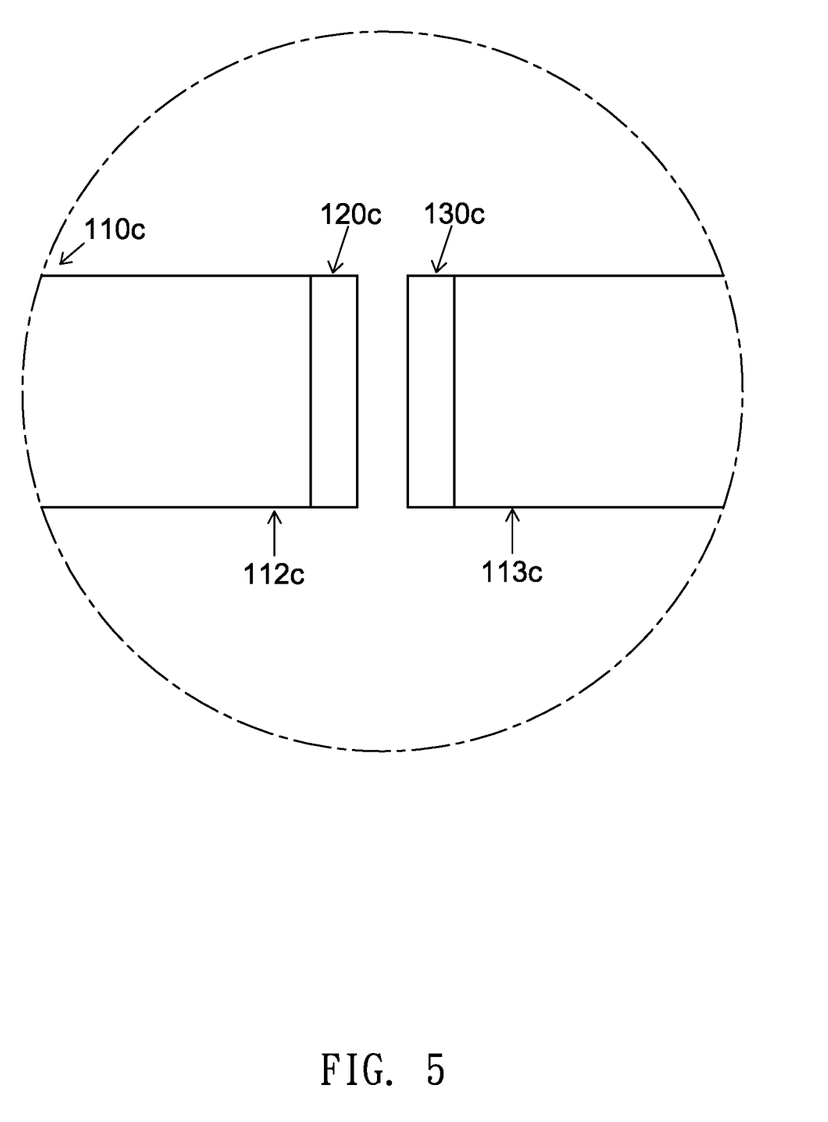
FIG. 5 is an enlarged partial schematic view of a tire tube according to the second embodiment of the invention.
Figure 6:
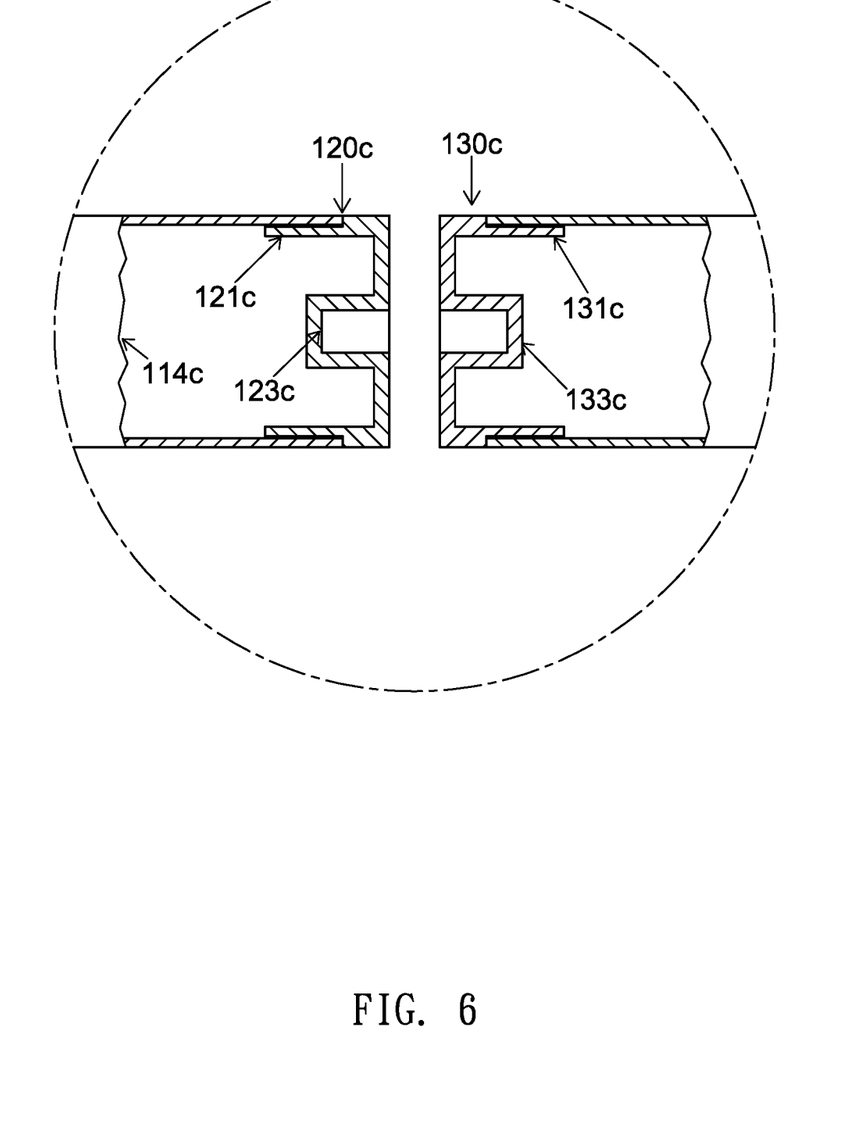
FIG. 6 is a cross-sectional view of the tire tube of FIG. 5.

FIG. 5 is an enlarged partial schematic view of a tire tube according to the second embodiment of the invention, and FIG. 6 is a cross-sectional view of the tire tube of FIG. 5. In FIG. 5 and FIG. 6, the tire tube includes a tube body 110c, a first connector 120c and a second connector 130c.

The tube body 110c includes a first end 112c, a second end 113c and a tube core 114c. The first connector 120c is connected to the first end 112c of the tube body 110c, and comprises a first inner ring portion 121c and a first operating portion 123c. The position of the first operating portion 123c is corresponding to the position of the tube core 114c of the tube body 110c. The dimension of the first inner ring portion 121c is less than dimension of the first end 112c of the tube body 110c, so as to the first connector 120c can be embedded to the first end 112c of the tube body 110c.

The second connector 130c is connected to the second end 113c of the tube body 110c, and comprises a second inner ring portion 131c and a second operating portion 133c. The position of the second operating portion 133c is corresponding to the position of the tube core 114c of the tube body 110c. The dimension of the second inner ring portion 131c is less than dimension of the second end 113c of the tube body 110c, so as to the second connector 130c can be embedded to the second end 113c of the tube body 110c.

<Third Embodiment>

Figure 7:
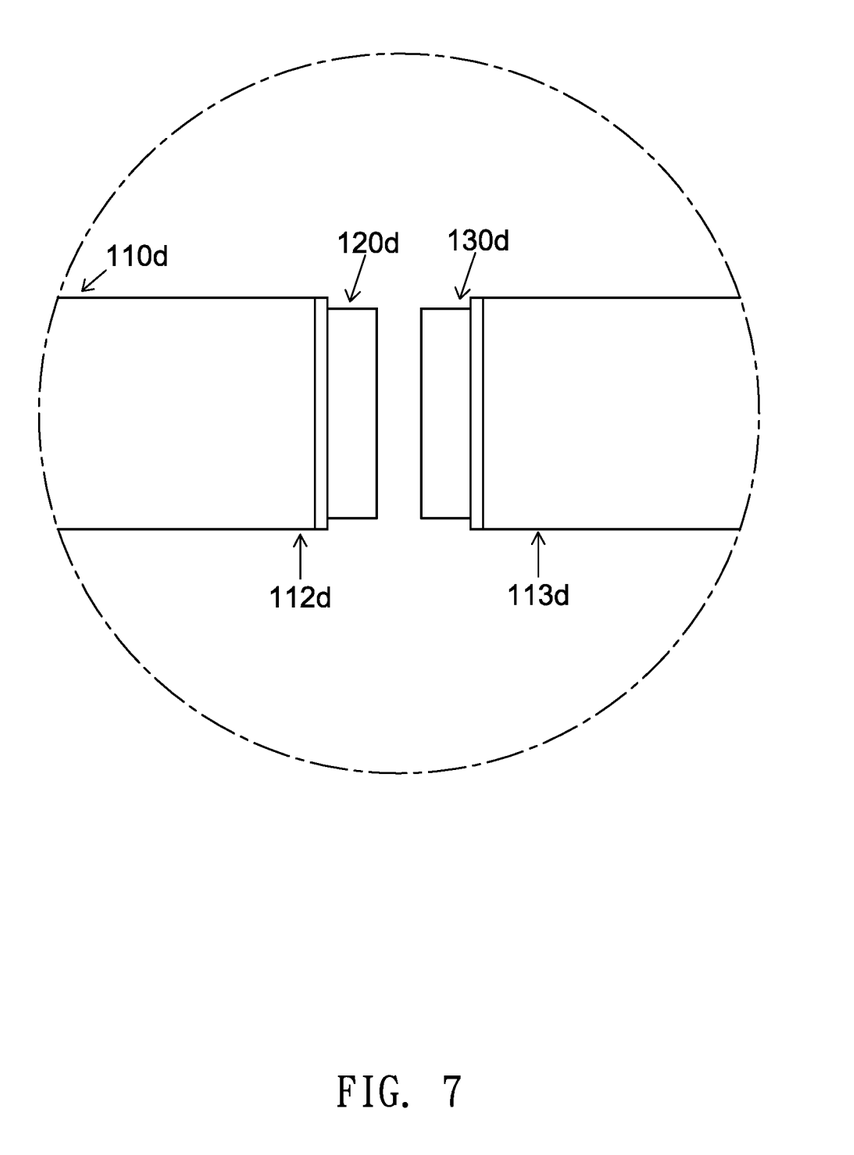
FIG. 7 is an enlarged partial schematic view of a tire tube according to the third embodiment of the invention.
Figure 8:
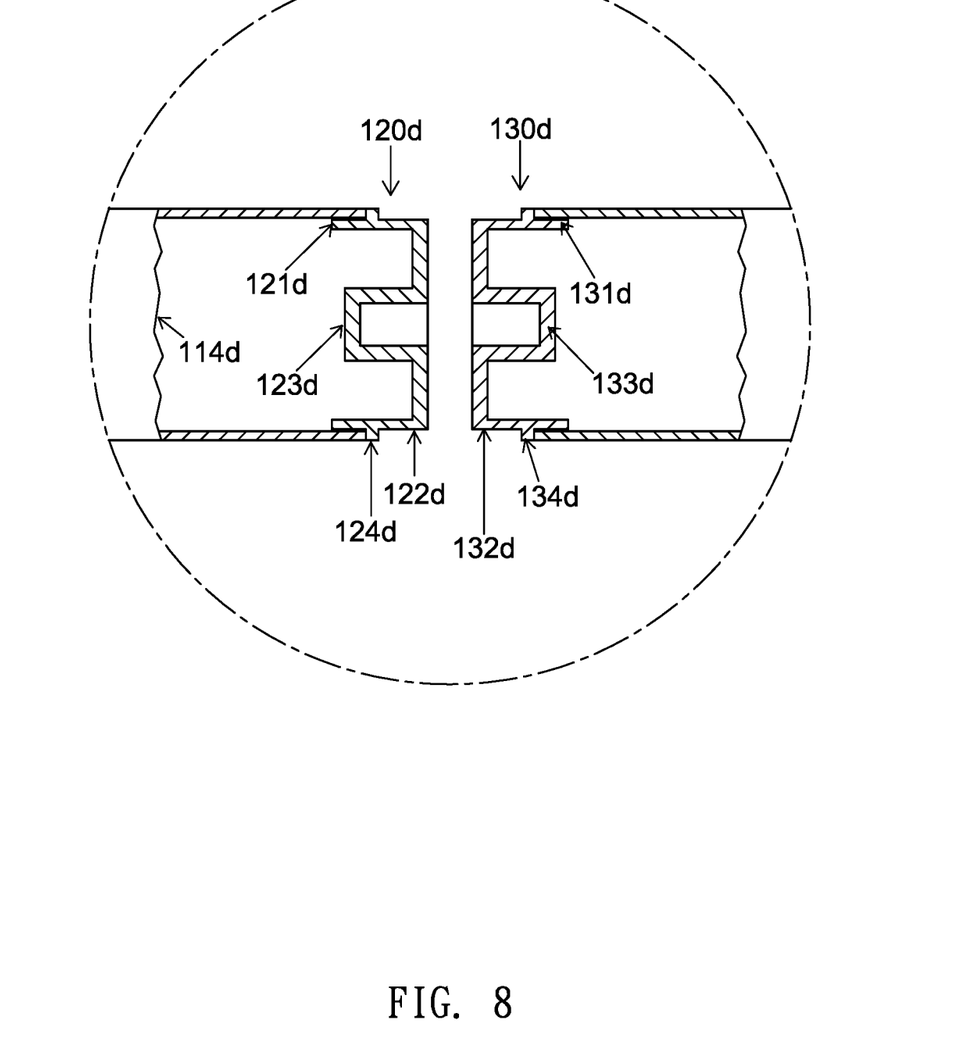
FIG. 8 is a cross-sectional view of the tire tube of FIG. 7.

FIG. 7 is an enlarged partial schematic view of a tire tube according to the third embodiment of the invention, and FIG. 8 is a cross-sectional view of the tire tube of FIG. 7. In FIG. 7 and FIG. 8, the tire tube 110d includes a tube body 110d, a first connector 120d and a second connector 130d.

The tube body 110d includes a first end 112d, a second end 113d and a tube core 114d. The first connector 120d is connected to the first end 112d of the tube body 110d, and comprises a first inner ring portion 121d, a first outer ring portion 122d, a first operating portion 123d and a first convex ring portion 124d. The position of the first operating portion 123d is corresponding to the position of the tube core 114d of the tube body 110d. The dimension of the first inner ring portion 121d and first outer ring portion 122d are less than the dimension of the first end 112d of the tube body 110d, and the dimension of the first convex ring portion 124d is equal to the dimension of the first end 112d of the tube body 110d, so as to the first connector 120d can be embedded to the first end 112d of the tube body 110d and limited by the first convex ring portion 124d.

The second connector 130d is connected to the second end 113d of the tube body 110d, and comprises a second inner ring portion 131d, a second outer ring portion 132d, a second operating portion 133d and a second convex ring portion 134d. The position of the second operating portion 133d is corresponding to the position of the tube core 114d of the tube body 110d. The dimension of the second inner ring portion 131d and the second outer ring portion 132d are less than the dimension of the second end 113d of the tube body 110d, and the dimension of the second convex ring portion 134d is equal to the dimension of the second end 113d of the tube body 110d, so as to the second connector 130d can be embedded to the second end 113d of the tube body 110d and limited by the second convex ring portion 134d.

<Fourth Embodiment>

Figure 9:
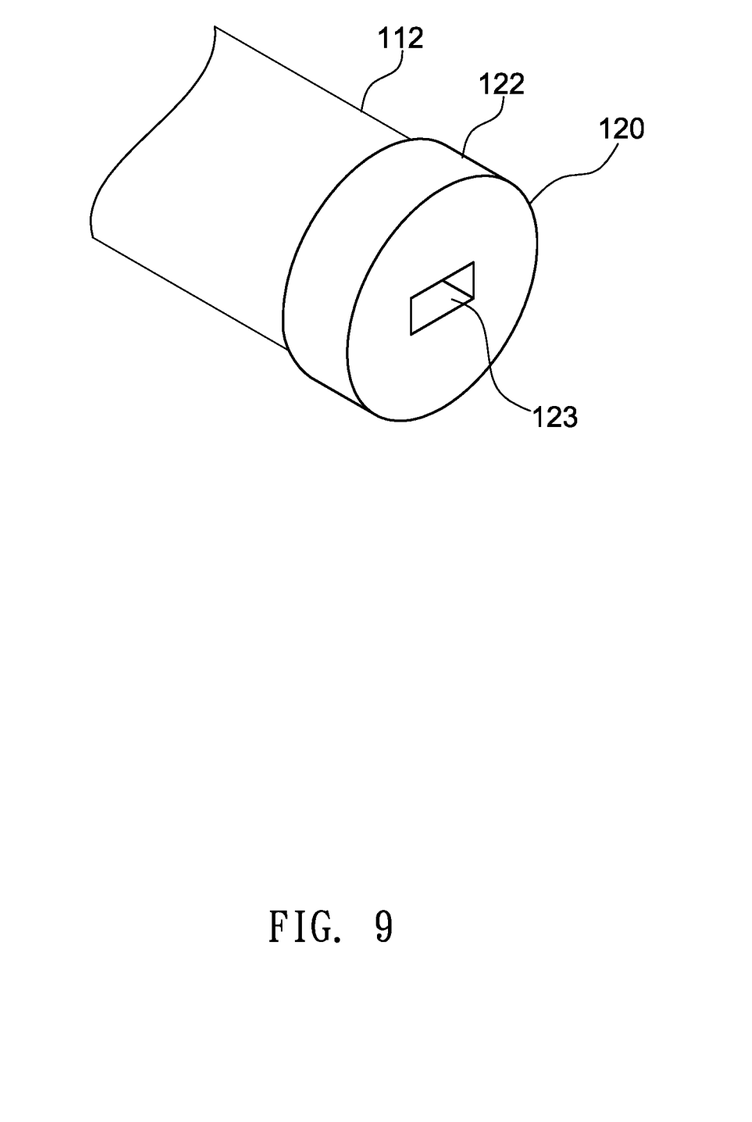
FIG. 9 is a partial schematic view of a tube body and a first connector of a tire tube according to the fourth embodiment of the invention.
Figure 10:
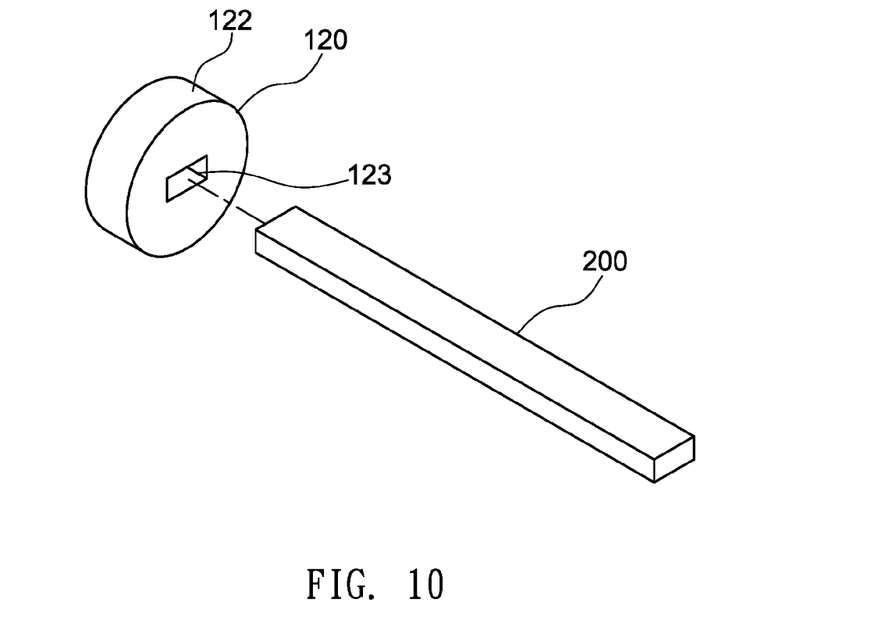
FIG. 10 is a first status schematic view showing that an operation of the first connector with the operator of FIG. 9.
Figure 11:
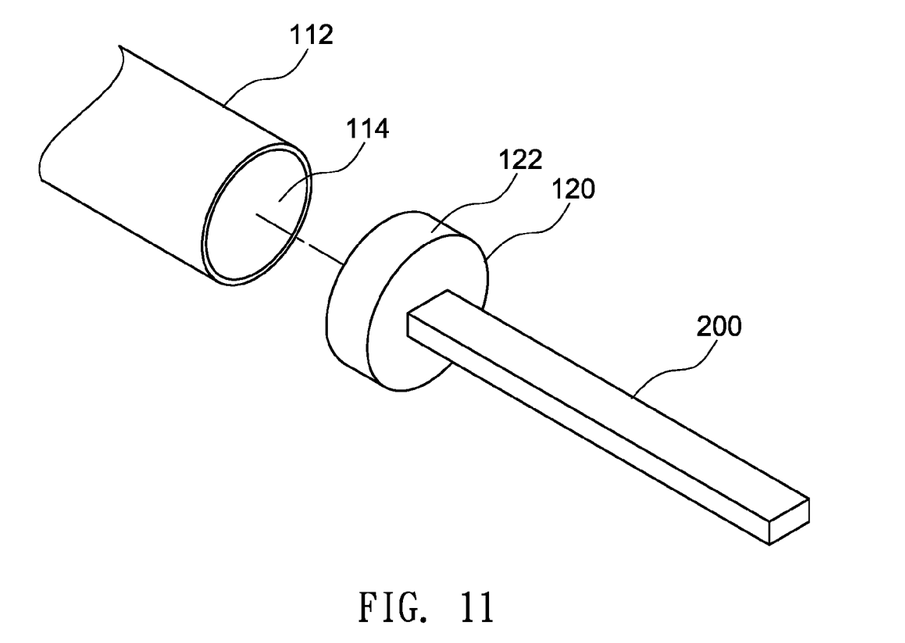
FIG. 11 is a second status schematic view showing that an operation of the first connector with the operator of FIG. 9.
Figure 12:
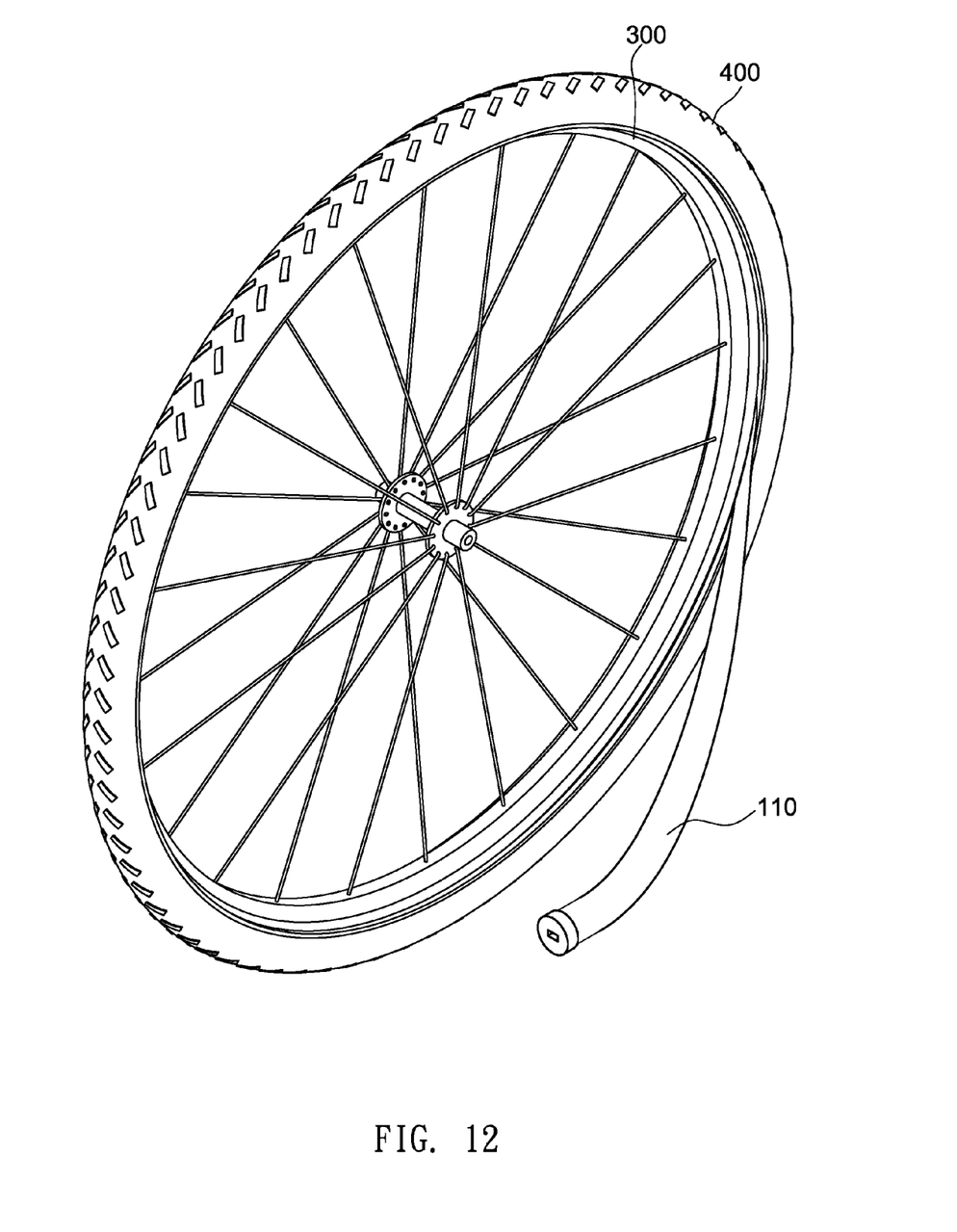
FIG. 12 is a schematic view showing that the example for installation of the tire tube of FIG. 9.

FIG. 9 is a partial schematic view of a tube body and a first connector of a tire tube according to the fourth embodiment of the invention, FIG. 10 is a first status schematic view showing that an operation of the first connector with the operator of FIG. 9, FIG. 11 is a second status schematic view showing that an operation of the first connector with the operator of FIG. 9, and FIG. 12 is a schematic view showing that the example for installation of the tire tube 100 of FIG. 9.

In FIG. 9, the first connector 120 is connected to the first end 112 and comprises a first outer portion 122 and a first operating portion 123. The dimension of the first outer portion is greater than the first end 112.

In FIG. 10 and FIG. 11, the first operating portion 123 of the first connector 120 can be driven by an operator 200, such as a square head screwdriver. More detailed, the operator 200 is inserted to the first operating portion 123 and is connected to the first end 112. Thereby the first operating portion 123 can provides the advantages of easy installation between the first connector 120 and the first end 112.

In FIG. 12, the tire tube 100 can be installed between a rim 300 and an outer tube 400. Since the tire tube 100 is mounted on the accommodating space formed between the rim 300 and the outer tube 400, the outer tube 400 forces against the tire tube 100 toward to the rim 300, so that the tire tube 100 can be an opened loop shape.

Although the invention has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the invention without departing from the scope or spirit of the invention. In view of the foregoing, it is intended that the invention cover modifications and variations of this disclosure provided they fall within the scope of the following claims.

What is claimed is:

1. A tire tube comprising:
   a tube body comprising an air jet, a first end, and a second end; and
   two connectors connected to the first end and the second end of the tube body respectively,
   wherein one of the connectors comprises a first inner ring portion and a first outer ring portion, the other of the connectors comprises a second inner ring portion and a second outer ring portion, the first inner ring portion is connected to the first end of the tube body, the first outer ring portion is removably connected to the second outer ring portion, and the second inner ring portion is connected to the second end of the tube body;
   wherein one of the connectors further comprises a first convex ring portion, and the other of the connectors further comprises a second convex ring portion; and
   wherein a dimension of the first convex ring portion is equal to a dimension of the first end of the tube body, and a dimension of the second convex ring portion is equal to the dimension of the second end of the tube body.

* * * * *